Figure 9:
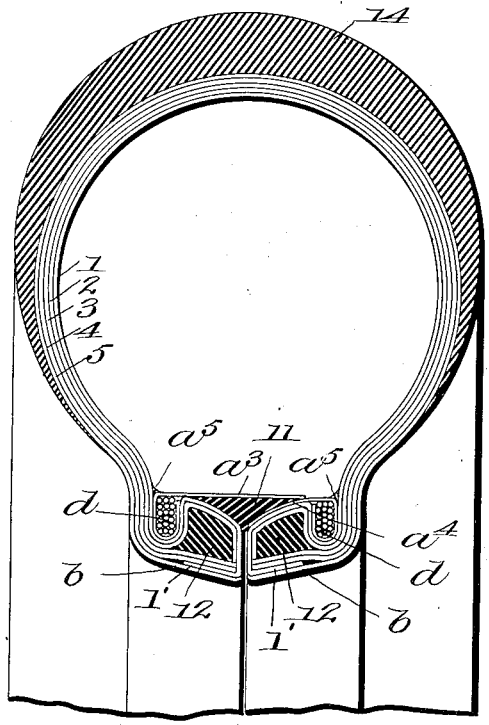

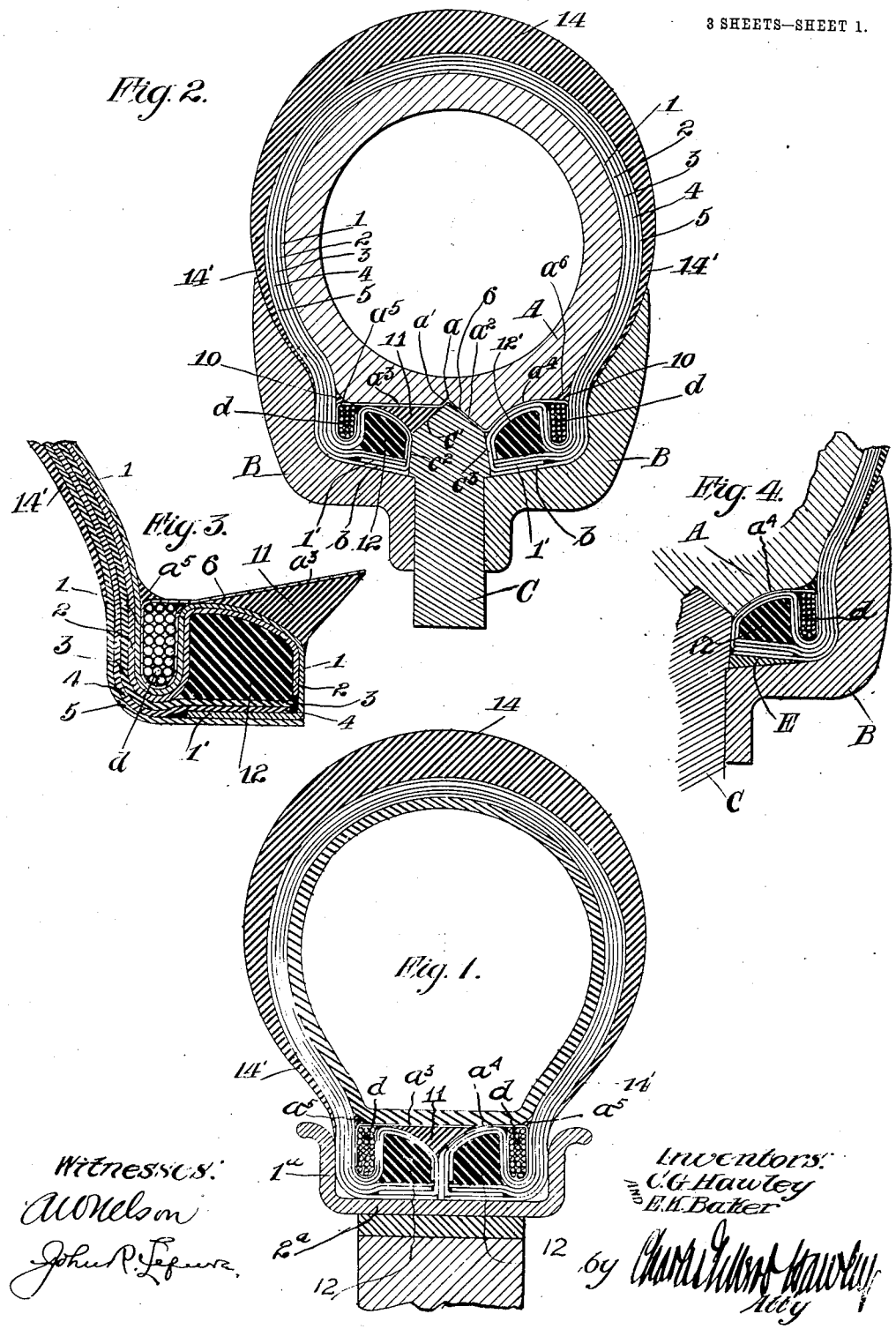

C. G. HAWLEY & E. K. BAKER.
PNEUMATIC TIRE CASING.
APPLICATION FILED APR. 11, 1908.
903,714.
Patented Nov. 10, 1908.
3 SHEETS—SHEET 2.
Fig. 5.
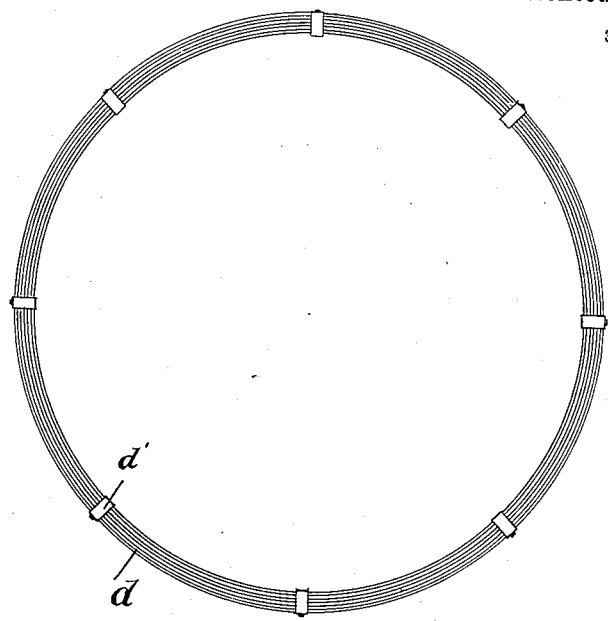
Fig. 7.
Fig. 8.
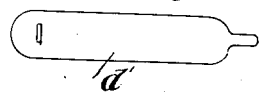
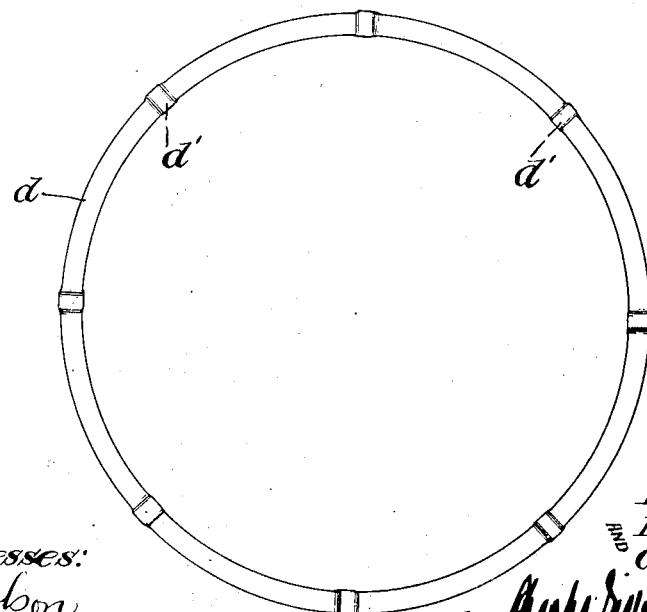
Fig. 6.
Witnesses:
A.C. Nelson
John R. Lefevre
Inventors:
E. K. Baker
C. G. Hawley
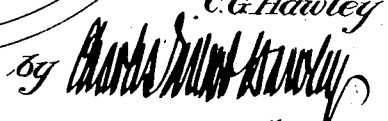
Atty.

C. G. HAWLEY & E. K. BAKER.
PNEUMATIC TIRE CASING.
APPLICATION FILED APR. 11, 1908.

903,714.

Patented Nov. 10, 1908.

3 SHEETS—SHEET 3.

Witnesses
Jno. A. Byrne
L. R. Brown

Inventors
C. E. Hawley
and E. K. Baker,
by Attorney

UNITED STATES PATENT OFFICE.

CHARLES GILBERT HAWLEY AND ERLE K. BAKER, OF CHICAGO, ILLINOIS.

PNEUMATIC-TIRE CASING.

No. 903,714.   Specification of Letters Patent.   Patented Nov. 10, 1908.

Application filed April 11, 1908. Serial No. 426,495.

*To all whom it may concern:*

Be it known that we, CHARLES GILBERT HAWLEY and ERLE K. BAKER, citizens of the United States, and residents of Chicago, in the county of Cook and State of Illinois, have invented a certain new, useful, and Improved Pneumatic-Tire Casing, of which the following is a full, clear, and exact description, such as will enable others skilled in the art to make and use the same.

Our invention relates to improvements in pneumatic tire shoes or casings and has special reference to improvements in the form and construction of the base portions or inner peripheries and the sides of such articles.

The present invention is an improvement upon that which is shown and described in Letters Patent No. 865,326 granted to us September 3, 1907, and the object of this invention is to somewhat simplify the structure therein shown, with a view to increasing the efficiency and durability of the casings or shoes and to lessen the cost thereof.

Still further objects of the invention will appear hereinafter.

Our invention consists generally in a pneumatic tire casing or shoe of the construction herein described and particularly set forth in the appended claims.

Our invention will be more readily understood by reference to the accompanying drawings, forming a part of this specification, and in which Figure 1 is a cross sectional view of a pneumatic tire casing embodying our invention, mounted upon a wheel rim; Fig. 2 is a cross sectional view illustrating not only a tire but also the mold upon which it is formed; Fig. 3 is an enlarged detail sectional view of one of the edges or base flanges of the shoe; Fig. 4 illustrates a modified form of our base flange; Fig. 5 is an elevation of one of the endless cables used in the tire; Fig. 6 is a similar view showing the cable in an incomplete stage; and Figs. 7 and 8 are detail views of the clips which we sometimes employ to hold the several wrappings of wire before the same are united. Fig. 9 is a section of the tire, of Figs. 1 and 2, showing it as it appears before it is placed on the rim shown in Fig. 1.

In these drawings we have shown our invention in the form which we consider the best. It should be remarked, however, that the form or construction which we prefer may be variously modified without departing from the spirit of the invention, which, therefore, is not confined to the specific details or forms herein shown. This tire-casing or shoe when finished and ready for use in its preferred form is a unit or unitary structure.

In describing the make-up of the tire it is necessary to refer to the several portions thereof as though they were separate, but after vulcanization they become substantially integral.

Our tire casing or tire, has two base portions, flanges, or feet so-called, which extend inwardly and are adapted to meet on the central or middle plane of the base. The thickness of the base portions preferably equals the height of the flanges, $1^a$, on the wheel rim, $2^a$, as indicated in Fig. 1, to receive the tread portion when the tire is deflated. In each base portion we place or embed an endless metallic cable or ring, $d$. All of the courses or layers of canvas or friction cloth pass beneath these rings or cables, and the edges of the pieces of cloth are folded, formed and supplemented in such manner as to make thick incompressible edges which lie within, *i. e.* at the inner sides of, the cables or rings; that is, each cable or ring lies between the heavy thickened or enlarged edge formation and the outer or side portion of the tire casing. The endless rings or cables are large and strong and they are inelastic and nonstretchable. They are of but slightly greater diameter than the wheel rim and hence smaller than the rim flanges, $1^a$. It will be obvious, therefore, that when the casing has been set upon the rim in the manner shown in Fig. 1 it cannot be displaced by internal pressure or by side shocks, as the metallic rings cannot be forced over the flanges, and therefore absolutely prevent such stretching of the base portions as would permit them to pass over the rim flanges. In this manner we accomplish the first initial and primary object of our invention; namely, the production of a tire casing, which, after being placed upon the wheel, cannot and will not be removed therefrom by any of the forces to which it is subjected in use.

As explained and as shown, the endless rings or cables are preferably embedded and vulcanized in the base portions of our casing and therefore cannot shift or move therein. The casing is made to fit the wheel rim snugly as shown, and the space between the rim and the cables in both directions is determined and measured by the thickness of the several parts or layers of fabric that pass beneath the cables.

The inner edges of the base portions, being principally composed of friction cloth and suitable fillers, are practically inextensible and non-compressible, but they are nevertheless, sufficiently contractible to be forced down upon and to hug the rim when they are subjected to the internal pressure of the inner tube. The combined effects of the hugging or gripping of the rim in this manner, made particularly effective by the holding rings or cables, and the effect of the outward pressure of the base portions against the wheel flanges effectually prevent the slipping of the inflated casing on the wheel rim, and this being obviated, what is called "rim cutting" is prevented. Thus further objects of our invention are attained.

We desire that notice be also taken of the fact that the sides of our casing, so far as concerns the fabric portion, are of uniform thickness from a point or line beneath one cable around to a corresponding point beneath the opposite cable. These points or lines, marked by the inner peripheries of the cables, are the hinge points between the base of the tire and the sides of the tire. The latter may therefore work freely over the flanges of the rim and, however they may be bent or compressed, the strain is distributed uniformly and no part is subjected to greater hinge action or bending than another. In like manner the points or lines marked by the cables, constitute the hinge points or lines of the base flanges which when forced down by the pressure of the air in the tire act through the relatively straight parts of the canvas directly beneath the cables and hence without straining or disrupting such parts of the casing.

The cables $d$ which we use in our improved casing are not circular in cross section, as before, but are of flattened form and present their flat sides parallel with and in substantial contact with the sides of the casing. These cables possess great strength and yet occupy little space in the flanges, laterally considered. In consequence of the use of the flattened or thin cables, we are able to relatively increase the size of the fillers that are formed or wrapped within the inner edges of the several layers of friction cloth or fabric. These fillers preferably rise to about the height or outer peripheries of the cables and are vulcanized to the layers of fabric, forming therewith stout edges for engagement with the inner sides of respective cables and which cannot possibly be pulled out beneath them when in place on the rim.

A flexible lip 11 formed on the inner edge of one of the flanges, laps upon the other flange and closes the joint between them. This joint is further closed by the pressure of the inner tube upon the lip 11 when the tire is inflated and if desired may be depended upon to hold the compressed air, though we prefer to always use an inner tube in our casing, as shown.

We also desire that notice be taken of the manner in which the layers of canvas are disposed beneath the cables and on opposite sides thereof. The construction is such as to enable the relatively easy stripping off of the three outer layers of canvas, when required in repairing the tire, a point of great practical importance.

A further distinctive feature of our present invention resides in the peculiar formation of the endless cables $d$ as depicted in Figs. 5 to 8. Our cable as here shown, is made from a single piece or strand of wire wrapped many times about or upon a suitable form. The ring thus made is temporarily fastened by clips $d'$ or by particles of solder and we then plate or coat either part or all of the cable with solder, copper or like metal which metallically unifies the several wrappings or strands of wire and, obviously, serves to unite the ends of the wire and prevent the opening or stretching of the cable. Though the cable is oval in cross section, it cannot collapse or be otherwise distorted after the strands are unified in this manner.

Because the article is a unitary structure and because accurate descriptions of several sections of the casing, taken at different points, require the use of opposite terms, it is somewhat difficult to clearly set forth the form and make-up of the article except the method or process of making the tire casing be also described and except a definite section of the article be selected as representative of the whole. To this end we have represented in Fig. 2 the tire mold whereon the parts are assembled and will hereinafter make reference to a section of the tire or casing taken at its top. The terms hereinafter used to indicate direction are only appropriate to such cross section.

Referring now to the drawings, and particularly to Fig. 2; A, represents the inner portion or core part of the tire mold. C, represents the central or mid portion of the mold, and, B, B, the two outer sections of the mold. The bottom or inner periphery of the core, A, contains a groove, $a$, which receives the edge of the mid portion, C. One side, $a'$, of the groove is low, the other side, $a^2$, is high. The V edge of the mid strip, $c$, on one side is substantially co-extensive, on the other it only partially occupies the groove, $a$, a wedge shaped recess being left between the surface, $c'$, of the mid strip and the surface, $a^3$, of the core, $a$. The surface, $a^3$, is substantially flat, except in the curved portion, $a^5$, where it merges with the side of the core, whereas the surface, $a^4$, is preferably concave and merges with its side of the core in a reverse curve, $a^6$, corresponding to the curve, $a^5$. The spaces between the sides of the core, A, and the inner sides of the pieces, B—B, but slightly exceed the thickness of the layers of canvas, small space being allowed for the rubber covering. It will be noted that the cables, $d$—$d$, occupy positions substantially equi-distant from adjacent side and bottom walls of respective mold pieces, $b$—$b$, the spaces corresponding to the thickness of the layers of canvas, as clearly shown. The bottom surfaces, $b$, of the parts, B—B are preferably inclined downwardly and in forcing them upon the raw or unvulcanized structure have the effect of wedging the thick edges up against the core, A. The outer sections of the mold are applied and bolted in place only after the structure has been built up on the core, A, and the mid section, C, that is, just before the raw casing or tire is placed in the vulcanizer. The wrappings used for forming the tread portion are wrapped on over the tire and the mold in the usual manner, or, an outer tread molding section may be substituted for the wrappings.

Having defined the nature, positions and parts constituting our novel casing we will now describe the manner of constructing the same, in order that others may fully understand the manner of carrying the invention into effect.

The cloth which we use in our casing is the so-called friction cloth, which is well known in the art, being fabric which is impregnated with rubber. When rubber is mentioned herein the word is intended to define a gutta percha composition or equivalent material. The first act in building up our tire consists in applying a strip, 6, of friction cloth to the bottom or base of the core; the strip being wider than the same. This strip is then bound in place by means of the mid piece, C. When the fabric, 6, has been secured in place the soft rubber fillers, 10, are placed on the bottom of the mold, and the cloth is pressed down upon the same. The soft rubber filler from which the lip, 11, is formed, is then pressed into place upon the fabric, 6, whereupon the tiremaker is ready to place the endless cables or rings, $d$, upon the mold. These rings are placed within the ring or collar formed by the strip of fabric, 6, and the edges of said strip are crimped down over and around the cables or rings, $d$, as well shown in Figs. 1 and 2. Before the cables are placed, they are coated with rubber, and the folded or crimped fabric holds them firmly enough to permit the main layers or courses of fabric to be laid and formed thereon with ease and rapidity and without detrimentally displacing the cables. It may here be mentioned that the strips of fabric, 6, serve four purposes; first, they temporarily hold the metal rings or cables, in the manner explained;—second, the strips, 6, permanently inclose the cables, helping to hold the same and relieving the main layers or courses of fabric from any possible abrasion thereby;—third, the strips, 6, traverse the space above or outside of the cables and prevent the disruption of the masses or rubber, 10, therein;—and fourth, the inner edge of the strip, 6, effectually strengthens the flexible lip, 11, and prevents the tearing thereof by the workmen's mold stripping tools or when inner tubes are being placed in or taken from the casing.

We much prefer an endless metal cable or band composed of many strands as in Figs. 5 and 6. Each cable is preferably formed of a single piece of wire wrapped and has the cross sectional shape shown in Figs. 1 to 4. The wrappings or turns of wire are temporarily secured by small pieces of wire wrapped transversely thereon or preferably by means of light sheet metal clips, $d'$, of the kind shown in Figs. 7 and 8. After being secured in this manner, we plate or coat the cable in any suitable manner, permitting the metal to enter the interstices of the coil or cable. The transverse wrappings or clips preferably remain on the cable and are coated with the rest thereof. Such a cable at every point possesses the strength represented by its cross section and the difficulties attending the joining of the ends of a ready made woven cable are eliminated. On the other hand a cable of our present construction is much stronger than a solid welded ring and is considerably more flexible. Nevertheless we desire that it shall be understood that our invention comprehends the substitution of solid rings for the built up endless rings or cables herein shown. When the strip, 6, the rubber fillers, and the cables have been applied to the mold in the manner explained the first course or layer of fabric, 1, is stretched on the mold core A, and its edges are folded inwardly around the respective cables. The edges are carried up to points above the cables and thence across to the mid strip, C, and thence down alongside the mid strip, where they are left temporarily. The courses or layers, usually four in number (indicated by numerals, 2, 3, 4 and 5) are then successively applied as follows: The layer, 2, is stretched and pressed upon the layer 1, and follows the same beneath the cable and thence upwardly and downwardly in S form, the edges terminating at about the points which are to become the inner and lower edges or corners of the base flanges. The fillers, 12 preferably of hard rubber, are then forced into place between the mid strip and respective cables. It will be noted that the upper surfaces, 12', of these fillers are convex. If desired the fillers may be triangular, but we prefer the fuller section herein shown. The layer of fabric, 3, is then applied and as shown its edges are carried downward beneath the cables and thence cross below the fillers, to the mid strip. The layer, 4, if used, follows and is like the layer 3. Then, before the layer, 5, is applied, the edges, 1', of the layer, 1, are folded down and outward on top of the edges of the layer or course, 4. The final course or layer, 5, is then stretched on and its edges, also carried beneath the cables, are smoothly formed across and applied to the outwardly folded edges of the layer, 1.

It will be noted that none of the edges of the fabric are carried outward and upward at the side of the tire. Instead the canvas is of uniform thickness throughout from cable to cable and is continuous between such points. When thus far completed the structure is ready for the application of the rubber coating or envelop 14.

We prefer to carry the side sheets, 14', of the rubber cover down to points where the rim flanges engage the base of the casing. The crude or raw casing or shoe is now ready for vulcanizing and the outer mold parts, B, having been forced into place the wrappings are applied and the whole placed in the vulcanizer. When removed from the vulcanizer the wrappings and the mold sections, B, B, are taken off, and the parting or mid strip, C, is disengaged and removed, after which the strip, 6, is severed with a knife. The core, A, being then removed, the tire is left, ready for use.

For use on certain rims we prefer to form the tire casing as shown in Fig. 2, i. e. with base flanges that flare inwardly toward the wheel center. Other rims require the base flanges to be straight or to flare outwardly, and for such we form the tire as indicated in Fig. 4, giving the base flanges the desired form by means of wedge shaped rings or bands, E, which we place upon the flanges before forcing the side pieces, B, into place.

As various modifications of our invention and its several features, will readily suggest themselves to others, we do not limit the invention to the specific structures herein shown and described.

Having thus described our invention we claim as new and desire to secure by Letters Patent:—

1. A tire casing provided with inwardly extending base portions which substantially meet at their inner edges and have endless metal rings embedded in their outer parts and coöperating fillers embedded in their inner parts, said rings being vertically elongated in cross section, as and for the purpose specified.

2. A tire casing having inwardly extending base portions adapted to abut and containing endless cables in their outer parts and coöperating fillers in their inner parts, said cables being vertically elongated in cross section and presenting their flat sides to the side portions of the casing substantially as described.

3. A tire casing comprising a number of layers or courses of fabric and a cover of rubber, said casing having inwardly extending base portions formed by the edges of the layers of fabric supplemented by suitable fillers and metal rings which are vertically elongated in cross section beneath which all layers pass, said rings being interposed between said base portions and the adjacent side portions of the casing, substantially as described.

4. A tire casing comprising a number of layers or courses of fabric, in combination with endless metal rings each composed of a single piece of wire and vertically elongated in cross section, ring like fillers parallel with respective rings, the edges of said layers being carried beneath respective rings and inclosing respective fillers and a covering of rubber, forming a tread portion, the whole being vulcanized and comprising a unitary structure, substantially as described.

5. A tire casing comprising a number of layers of fabric, in combination with endless metal rings, ring like fillers parallel with respective rings, rubber fillers enveloping said rings, the edges of said layers being carried beneath respective rings, the inner layers in each case being carried upward at the inner side of the metal ring, thence across the filler and thence downwardly at the inner side of the filler, the outer layer in each case extending across beneath the filler, and the whole being vulcanized and constituting a unitary structure, substantially as described.

6. A tire casing comprising a plurality of layers of fabric, two endless metal rings vertically elongated in cross section and having flat sides, ring like fillers parallel with respective rings and separate pieces of fabric covering said metal rings, the edge portions of all layers being carried beneath respective metal rings and enveloping respective fillers, the whole being vulcanized and constituting a unitary structure, substantially as described.

7. A tire casing having inwardly extending base portions, each containing an inexpansible endless metal ring composed of a plurality of turns or wraps of wire metallically unified and vertically elongated in cross section, substantially as described.

8. A tire casing having in each edge or base portion an endless metal ring composed of a plurality of turns or wraps of wire metallically unified at intervals, substantially as described.

9. A tire casing having in each edge or base portion an endless metal ring composed of a plurality of turns or wraps of wire metallically unified throughout, substantially as described.

10. A tire casing having in each edge an endless ring comprising a plurality of turns or wraps of wire mechanically united at several points and metallically unified, substantially as described.

11. The herein described article of manufacture comprising a tire casing having embedded in each edge an endless ring composed of a plurality of turns or wraps of wire metallically unified and provided at intervals with substantially integral enlargements, substantially as described.

12. A tire casing comprising a plurality of layers of fabric, in combination with endless metal rings and ring like fillers parallel with respective rings, the edges of the inner layers of fabric passing upwardly at the inner sides of respective rings and thence downwardly over respective fillers, the edges of the outer layers of fabric passing beneath respective rings and fillers and inclosing the edge of at least one of the inner layers in each case, the whole constituting a unitary structure, substantially as described.

13. A tire casing having inwardly extending thick base portions containing in their outer parts endless metal rings, pieces of fabric covering respective rings and extending across respective base portions and a flexible lip of rubber upon one only of said base portions beneath the fabric strip thereof, the whole vulcanized and constituting a unitary structure, substantially as described.

14. A tire casing comprising a plurality of layers of fabric, endless metal rings which are vertically elongated in cross section, fillers of substantially incompressible vulcanizable material and masses of rubber enveloping said metal rings, the edge portions of certain layers extending upwardly at the inner sides of respective rings and thence downwardly over respective fillers, the edges of other layers extending beneath respective rings and fillers and the whole being vulcanized and constituting a unitary structure, substantially as described.

15. A tire casing provided with inwardly extending base portions having inextensible endless metal rings vertically elongated in cross section embedded in their outer parts and fillers embedded in their inner parts respectively, the portions containing the fillers being flared inwardly towards the center of the tire and of less diameter than the portions containing the rings, substantially as described.

In testimony whereof, we have hereunto set our hands, this 28th day of March, 1908, in the presence of two subscribing witnesses.

CHARLES GILBERT HAWLEY.
ERLE K. BAKER.

Witnesses:
JOHN R. LEFEVRE,
M. SIMON.